(12) United States Patent
Palena et al.

(10) Patent No.: US 7,942,145 B2
(45) Date of Patent: May 17, 2011

(54) RECHARGEABLE SELF-HEATING FOOD CONTAINER

(76) Inventors: Travis Palena, Vancouver, WA (US); Morris Torseth, Tigard, OR (US); Mark E. Beatty, Vancouver, WA (US)

(*) Notice: Subject to any disclaimer, the term of this patent is extended or adjusted under 35 U.S.C. 154(b) by 957 days.

(21) Appl. No.: 11/787,502

(22) Filed: Apr. 16, 2007

(65) Prior Publication Data

US 2008/0251063 A1    Oct. 16, 2008

(51) Int. Cl.
F24J 1/00 (2006.01)
A47J 36/28 (2006.01)
(52) U.S. Cl. ............... 126/263.03; 126/236.01
(58) Field of Classification Search ............. 126/263.01, 126/263.03
See application file for complete search history.

(56) References Cited

U.S. PATENT DOCUMENTS

| | | | |
|---|---|---|---|
| 3,864,976 A * | 2/1975 | Parker | 374/161 |
| 4,283,427 A | 8/1981 | Winters et al. | |
| 4,316,070 A | 2/1982 | Prosise et al. | |
| 4,439,656 A | 3/1984 | Peleg | |
| 4,460,546 A | 7/1984 | Kapralis et al. | |
| 4,580,547 A | 4/1986 | Kapralis et al. | |
| 4,860,729 A | 8/1989 | Benson et al. | |
| 4,880,953 A | 11/1989 | Manker | |
| 4,899,727 A | 2/1990 | Kapralis et al. | |
| 4,956,533 A * | 9/1990 | Seaborne | 219/759 |
| 4,983,798 A | 1/1991 | Eckler et al. | |
| 5,005,374 A * | 4/1991 | Spitler | 62/259.3 |
| 5,056,589 A | 10/1991 | Hettel et al. | |
| 5,058,563 A * | 10/1991 | Manker | 126/263.04 |
| 5,143,048 A | 9/1992 | Cheney, III | |
| 5,183,787 A * | 2/1993 | Seaborne | 501/143 |
| 5,275,156 A | 1/1994 | Milligan et al. | |
| 5,601,744 A * | 2/1997 | Baldwin | 219/689 |
| 5,645,749 A * | 7/1997 | Wang | 219/759 |
| 5,792,213 A * | 8/1998 | Bowen | 607/96 |
| 5,916,470 A | 6/1999 | Besser et al. | |
| 6,079,405 A | 6/2000 | Justo | |
| 6,123,065 A | 9/2000 | Teglbjarg | |
| 6,147,337 A | 11/2000 | Besser | |
| 6,403,938 B2 | 6/2002 | Witonsky et al. | |
| 6,410,896 B2 | 6/2002 | Witonsky et al. | |

(Continued)

FOREIGN PATENT DOCUMENTS

DE    20100141 U1 * 6/2001

(Continued)

*Primary Examiner* — Kenneth B Rinehart
*Assistant Examiner* — Jorge Pereiro
(74) *Attorney, Agent, or Firm* — Mark E. Beatty; Kurt M. Rylander; Rylander & Associates P.C.

(57) ABSTRACT

A rechargeable, self-heating food container includes an inner chamber with a supersaturated salt solution and trigger means for initiating crystallization of the supersaturated salt solution. A rechargeable element for heating food includes a cylinder containing a supersaturated salt solution sealingly insertable into a food container, with a trigger in fluid contact with the supersaturated salt solution. A method of heating a food container includes providing a food container with an internal chamber, a supersaturated salt solution contained in the internal chamber, and a trigger to initiate crystal nucleation within the supersaturated salt solution in an exothermic reaction; and recharging by heating the food container until the salt crystals melt, and cooling the salt solution to a supersaturated state. A portable recharger for a rechargeable heating element includes an insulated sleeve with electric resistive heating element pluggable into an automobile or conventional ac outlet.

16 Claims, 6 Drawing Sheets

U.S. PATENT DOCUMENTS

| | | | |
|---|---|---|---|
| 6,415,624 B1 * | 7/2002 | Connors et al. | 62/457.3 |
| 6,708,883 B2 | 3/2004 | Kolb | |
| 7,082,784 B2 * | 8/2006 | Roth et al. | 62/457.2 |
| 7,287,656 B2 * | 10/2007 | Guilford et al. | 215/11.1 |
| 2005/0145242 A1 | 7/2005 | Romeu | |
| 2005/0218102 A1 * | 10/2005 | Guilford et al. | 215/11.1 |
| 2006/0032605 A1 * | 2/2006 | Kolowich | 165/10 |
| 2006/0151484 A1 | 7/2006 | Edmark | |
| 2008/0087270 A1 * | 4/2008 | Shaikh et al. | 126/263.01 |
| 2008/0179311 A1 * | 7/2008 | Koro et al. | 219/430 |

FOREIGN PATENT DOCUMENTS

| | | | |
|---|---|---|---|
| FR | 2712187 A1 | * | 5/1995 |
| FR | 2753896 A1 | * | 4/1998 |
| GB | 2398478 A | * | 8/2004 |

* cited by examiner

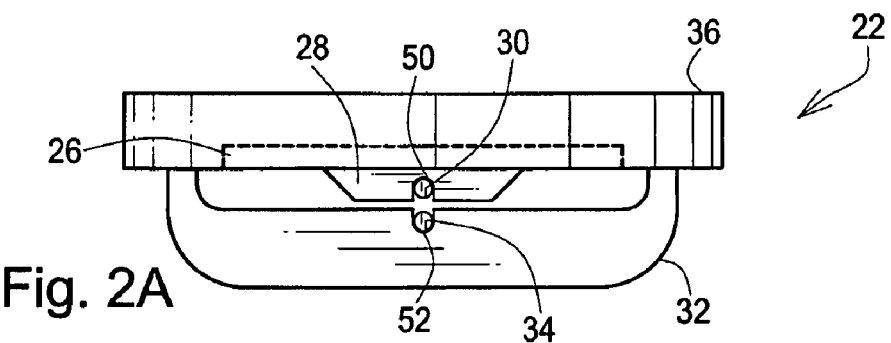
Fig. 2A
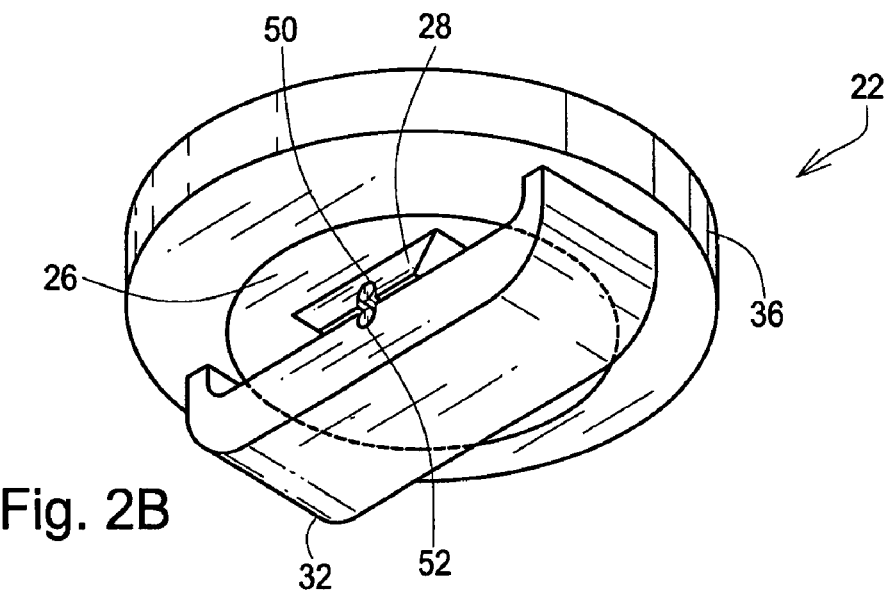
Fig. 2B
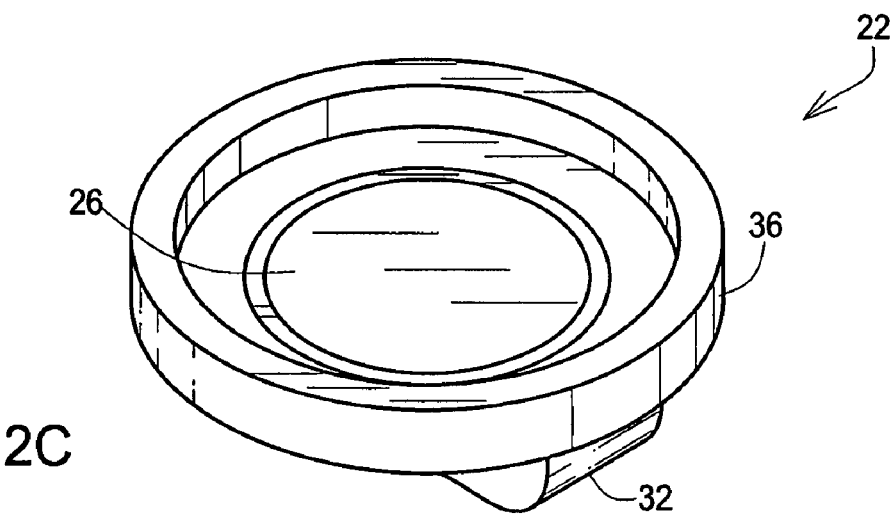
2C

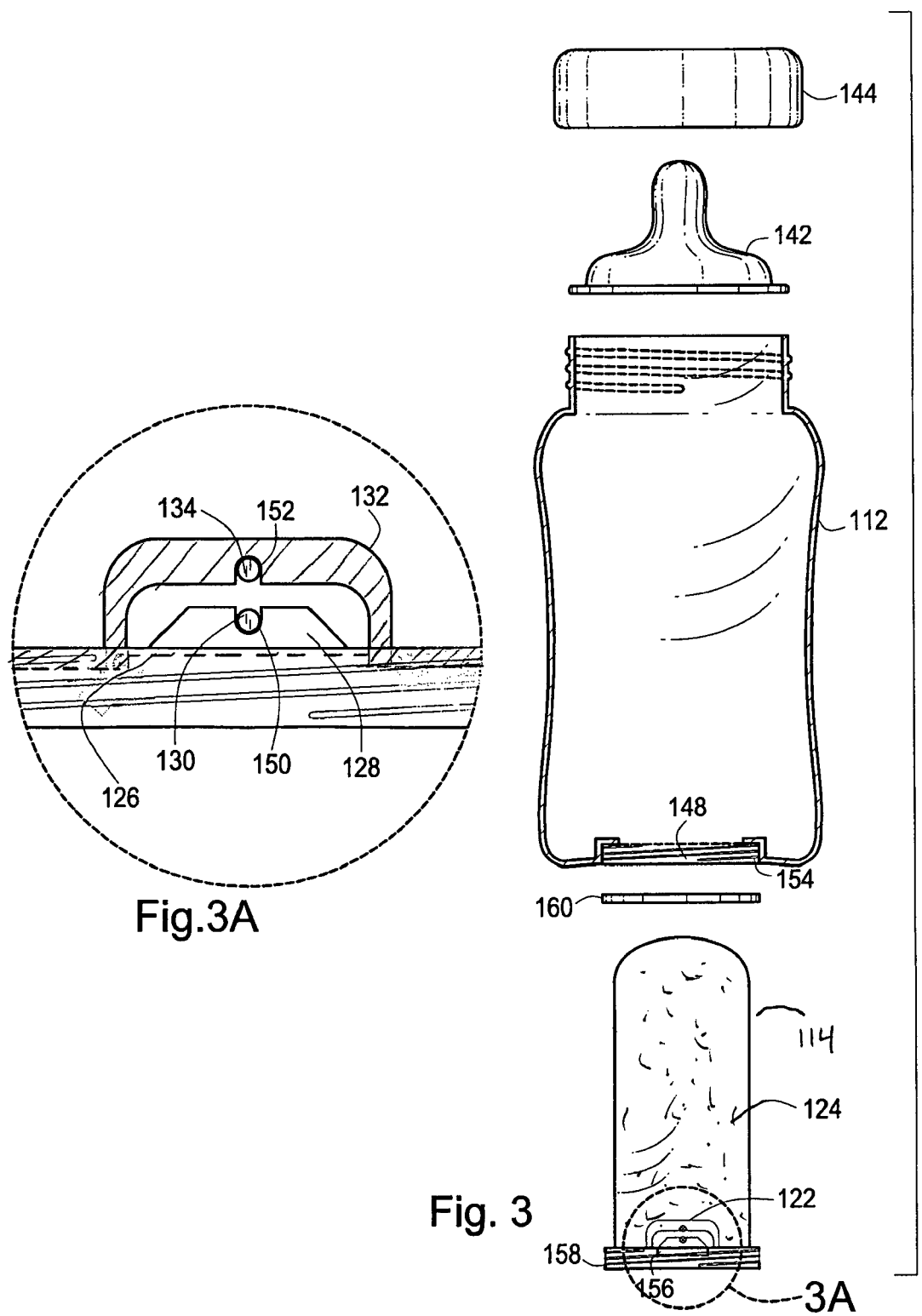

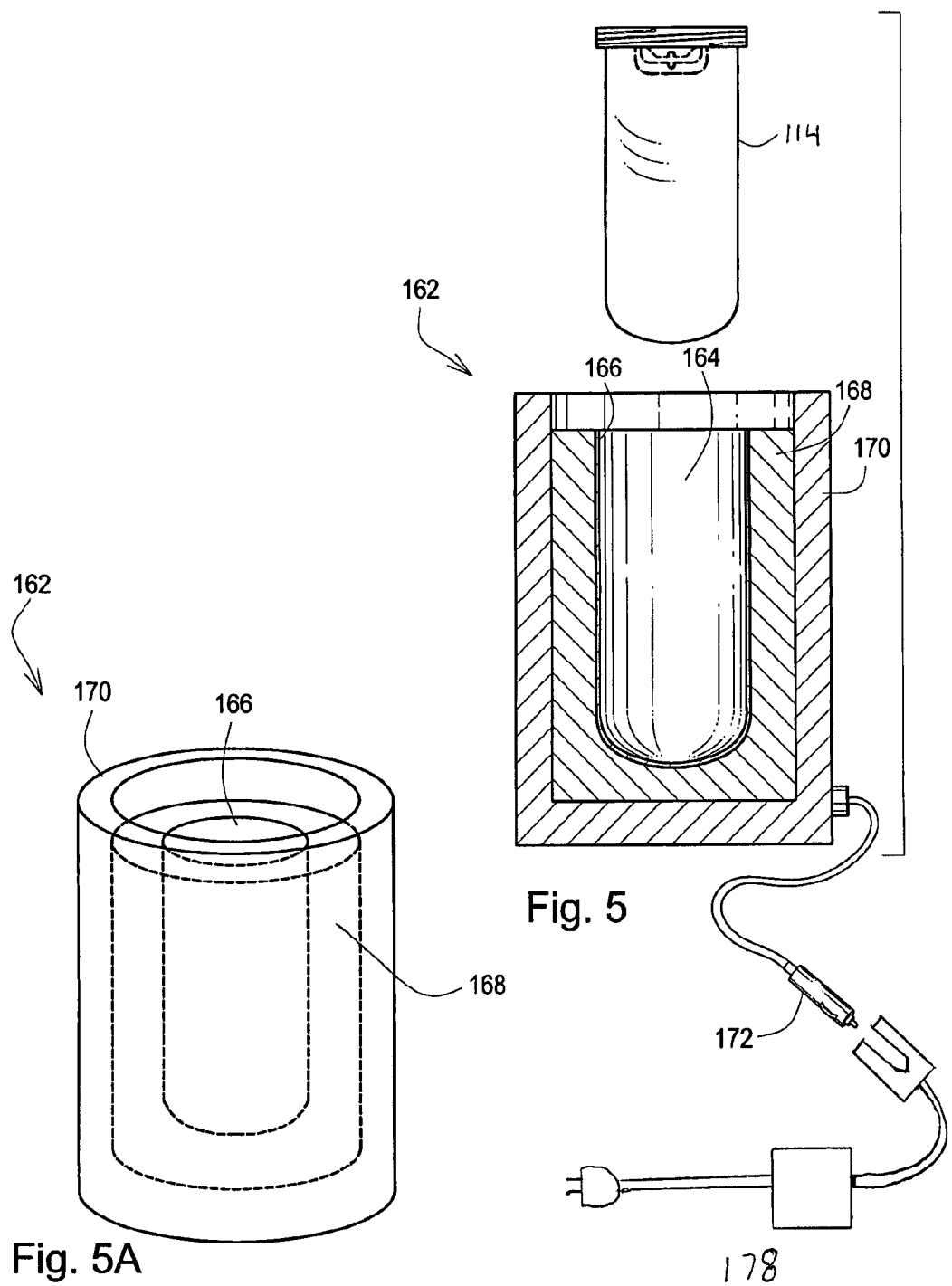

RECHARGEABLE SELF-HEATING FOOD CONTAINER

FIELD OF THE INVENTION

The present invention relates to self-heating food containers. More particularly, the present invention relates to apparatus and methods of rechargeable, self-heating food containers using supersaturated salt solutions and portable rechargers for such devices and methods.

BACKGROUND

Most infants prefer liquid/food to be 98° F.+/−10° F. (36° C.+/−5.5° C.) which requires a heating method. Most heating methods are slow and can potentially overheat the contents leading to the possibility of scalding. In addition, microwave ovens are disfavored for warming breast milk due to potential nutrient loss and lack of precise temperature control.

The principles of thermal energy storage in phase-change materials are known. A salt solution may be "supersaturated", i.e. containing more than the equilibrium amount of dissolved solute at a specific temperature. A typical salt used is a solution of sodium acetate trihydrate ($NaC_2H_3O_2$-$3H_2O$). The sodium acetate trihydrate can also be a "supercooled" solution, where it is cooled below its freezing point without transforming into a solid. Sodium acetate has a freezing point of 131° F. (54° C.), but can easily exist as a supercooled liquid at room temperature. The supersaturated, supercooled solution of sodium acetate is unstable and will crystallize if a seed crystal is present or a disturbance causes initiation of crystallization. This crystallization to a solid is exothermic, meaning it releases heat. The transition of sodium acetate trihydrate to solid form rapidly warms the salt solution, up to a maximum of approximately 54° C. (131° F.). It will stay at approximately this temperature until all of the sodium acetate has crystallized and the stored chemical energy has been completely converted to thermal energy. The energy so released may be put to practical use in many ways.

The solution used for phase-change heat packs is typically sodium acetate trihydrate which has the advantage of being food safe, FDA approved, and widely available. Other salts known to exhibit similar behavior but with differing melt points, include: sodium sulfate decahydrate ($Na_2SO4$-$0H_2O$), sodium thiosulfate pentahydrate ($Na_2S_2O_3$-$5H_2O$), sodium chromate decahydrate ($Na_2CrO_4$-$10H_2O$), calcium chloride hexahydrate ($CaCl_2$-$6H_2O$), magnesium chloride hexahydrate ($MgCl_2$-$6H_2O$), magnesium nitrate phosphate dodecahydrate ($Mg_2(NO_3)(PO_4)$-$12H_2O$), calcium nitrate trihydrate ($Ca(NO_3)_2.3H_2O$), and trimethylol ethane hydrate ($C_5H_{12}O_3.H_2O$), among others, will function in essentially the same manner.

Supersaturation is achieved by first heating a solution of salt in water to above the crystal melt point, thereby allowing the ions to completely dissociate their bonds and dissolve in the water, then cooling the solution. For example, the melt point for sodium acetate trihydrate is 54° C. (131° F.). Supersaturation can be achieved by heating a solution of sodium acetate trihydrate to at least 54° C. (131° F.) until all crystals are dissolved, then cooling the solution to room temperature (approximately 20° C. or 68° F.).

Crystallization can be induced by introducing a crystal nucleus at a temperature below melt point, or by creating a crystal nucleus by compressing a small portion of solution in a trigger to induce crystallization, which then cascades throughout the solution. This crystallization is an exothermic process at room temperature, and the heat given off can be used as a heat source, such as for heating food. After the solution has crystallized the supersaturated solution can be regenerated by reheating the solution to above melt point, until the crystals completely dissolve, and then allowing the solution to cool again. The supersaturated solution remains dissolved and will not spontaneously nucleate even at normal refrigerator temperatures of (1-3° C.) 33-38° F., unless initiated by a trigger or nucleate crystal.

The maximum temperature is self-limited by the maximum temperature of the salt solution undergoing crystallization. For example, a typical supersaturated solution of sodium acetate trihydrate reaches a maximum temperature of approximately 54° C. (131° F.) when triggered from room temperature. This heat energy can be transferred to food within a container through the walls of a heating element within the container.

The precise mechanism causing nucleation by compression is not clearly understood but it is believed that the pressure disturbance causes some of the molecules to flip to the solid crystal state thereby providing seeds for cascading crystallization. Metallic mechanisms can be used to induce crystal nucleation, but metallic mechanisms have the disadvantage of not being microwave safe. Ceramics are microwave safe, but not all ceramics are reliable in generating crystal nuclei through compression. Applicants have determined through experimentation that steatite, a crystalline form of magnesium silicates such as ($Mg_3Si_4O_{10}(OH)_2$), which is commonly used as an insulating material in electrical components, is reliable and effective in initiating nucleation. Nucleation may be induced by compressing two pieces of steatite together, or by compressing a single steatite element against another hard material such as ceramic, metal, or hard plastic. The specific shape of the steatite element is not critical, so a shape convenient to manufacture can be used.

Not all ceramics are reliable in initiating crystallization by compression. Materials found not to be reliable were: aluminum silicate, alumina at 96% aluminum oxide, alumina at 99% aluminum oxide, cordierite (magnesium aluminum silicate), silicon carbide, titanate (titanium dioxide), zirconia (zirconium dioxide), porcelain (kaolinite), alumina silicate, mullite (alumina silicate lava), quartz/silica, wollastonite (calcium magnesium silicate), borosilicate glass (e.g. Pyrex™ from Corning, Inc.), silicon nitride, boron nitride, glass ceramic, mica/borosilicate (Macor™ from Corning, Inc.), stoneware, and Material 10.90 (a ceramic material from Associated Ceramics and Technology, part number 724-353-1585).

Heating devices using this heat released by supersaturated salt solutions transforming from the dissolved state to crystalline or frozen when occurring below their freezing point are known. Recharging these devices by heating them using an external heat source or microwaves is also known. However, existing devices do not provide safe, effective, and convenient means for using supersaturated salts to heat food such as in a baby bottle or thermos, using an accessible but protected and reliable trigger devices, and which can be recharged and reused indefinitely.

The following represents a list of known related art:

| Reference: | Issued to: | Date of Issue/Publication: |
| --- | --- | --- |
| U.S. Pat App 2005/0145242 A1 | Romeu | Published Jul. 7, 2005 |
| U.S. Pat. No. 4,983,798 | Eckler et al | Jan. 8, 1991 |
| U.S. Pat. No. 6,410,896 | Witonsky et al | Jun. 25, 2002 |

-continued

| Reference: | Issued to: | Date of Issue/Publication: |
|---|---|---|
| U.S. Pat. No. 6,708,883 B2 | Kolb | Mar. 23, 2004 |
| U.S. Pat. No. 6,123,065 | Teglbjarg | Sep. 16, 2000 |
| U.S. Pat. No. 6,079,405 | Justo | Jun. 27, 2000 |
| U.S. Pat. No. 4,880,953 | Manker | Nov. 14, 1989 |
| U.S. Pat. No. 5,275,156 | Milligan, et al. | Jan. 4, 1994 |
| U.S. Pat. No. 4,460,546 | Kapralis, et al. | Jul. 17, 1984 |
| U.S. Pat. No. 4,899,727 | Kapralis, et al. | Feb. 13, 1990 |
| U.S. Pat. No. 4,580,547 | Kapralis, et al. | Apr. 8, 1986 |
| U.S. Pat. No. 5,056,589 | Hettel, et al. | Oct. 15, 1991 |
| U.S. Pat. No. 5,143,048 | Cheney, III | Sep. 1, 1992 |
| U.S. Pat. No. 4,860,729 | Benson, et al. | Aug. 29, 1989 |

The teachings of each of the above-listed citations (which does not itself incorporate essential material by reference) are herein incorporated by reference. None of the above inventions and patents, taken either singularly or in combination, is seen to describe the instant invention as claimed.

U.S. Pat. App. 2005/0145242 A1 to Romeu discloses an autothermic packaging food container, which has separate compartments to contain the chemicals prior to reaction, is not reusable. U.S. Pat. No. 6,708,883 to Kolb discloses an infant nipple attachment which is disposable and not reusable. U.S. Pat. No. 6,123,065 to Teglbjarg discloses a feeding bottle which heats with the mixing of two chemicals, which limits the heating unit as disposable and not rechargeable. U.S. Pat. No. 6,079,405 to Justo discloses a dual food product mixing container that utilizes two chambers required to mix chemicals for heating which limits the unit to a single use.

U.S. Pat. No. 4,983,798 to Eckler, et al, discloses a method of using organic solids exhibiting meso-crystalline transition temperatures within a range of 30-200° C. to maintain warm foods warm. Eckler however, does not discuss using supersaturated salt solutions. Nor does Eckler disclose apparatus or methods which are stable at room temperature or refrigeration temperatures for an indefinite period and then activated for use only at the desired time. Eckler requires the heating apparatus to be pre-heated, and then this apparatus merely retains this heat for a prolonged period through the meso-crystalline phase-transition process. Thus it lacks the advantages of indefinite storage in a ready-to-use condition and activation only when desired by the user.

U.S. Pat. No. 4,880,953 to Manker, discloses a method of recharging a heat pack by microwave energy where the flexible pack must have no "welds" to trap solution and cause "hot-spotting". However, Manker only teaches metallic spring-type activators floating freely within a seamless flexible pack. Manker would therefore not be usable within a bottle or food container because the pack is not rigid and the trigger mechanism would be inaccessible. Manker does not disclose interchangeable rechargeable heating elements insertable into bottles, nor portable recharging devices.

U.S. Pat. No. 5,275,156 to Milligan, et al., discloses a trigger device that floats free in a supercooled salt solution which is activated by applying pressure to the device. This device has the same disadvantages as Manker. The device in Milligan is also susceptible to inadvertent activation if agitated, because the solid objects in the trigger are free to contact each other when jostled.

U.S. Pat. Nos. 4,460,546, 4,899,727 and 4,580,547 to Kapralis, et al., disclose the use of another set of trigger devices which float free in the supercooled salt solution or which use metallic discs (generally, Kapralis, et al., disclose concave discs which are caused to "snap" in order to activate the heat pack). Kapralis does not disclose the ability to regenerate the heating device, nor does Kapralis disclose use of ceramic materials. Kapralis does not disclose a device susceptible to use with food containers or bottles, and does not disclose a portable regenerator.

U.S. Pat. No. 5,056,589 to Hettel, et al., discloses only the use of metallic spring mechanism free floating in a flexible pouch for crystallizing a supercooled salt solution. U.S. Pat. No. 5,143,048 to Cheney, III, describes a trigger device which requires breaking an ampoule or disk to initiate a chemical catalyst, and is therefore not rechargeable or reusable.

U.S. Pat. No. 4,860,729 to Benson, et al, discloses a trigger device which traps a crystallite of the material between two solid objects and retains it there by pressing the objects together with enough force to create sufficient pressure to keep the crystallite isolated between the two solid objects when it is immersed in the phase-change material to keep it from melting. This has the disadvantage that the trigger must be specifically prepared prior to regeneration and requires complex apparatus to achieve. In addition, the trigger is susceptible to inadvertent activation if disturbed, as a crystal nucleus is always present and liable to trigger crystallization if liquid leaks into the retaining area or the pressure is relieved slightly. Nor does Benson disclose non-metallic apparatus, or a portable recharging devices.

U.S. Pat. No. 6,410,896 to Witonsky, et al, discloses use of liquid crystal temperature indicators in conjunction with devices for distributing microwave evenly throughout a liquid filled bottle for heating. Witonsky, however, does not discuss using rechargeable heating elements using supersaturated salt solutions.

Still other features would be desirable. For example, a system whereby rechargeable heating elements could be easily recharged in an automobile or hotels during long trips would be useful. Heating elements which are easily carried and can be quickly and easily exchanged using purpose designed or standard food containers would be advantageous.

Thus, while the foregoing body of art indicates it to be well known to have a heating element using supersaturated salts, the art described above does not teach or suggest a food container or baby bottle which has the following combination of desirable features: (1) reusable; (2) rechargeable in a microwave oven; (3) dishwasher and food safe; (4) may be interchangeable; (5) may include a temperature indicator; (6) won't harm breast milk (as can happen with a microwave) or baby formula; (7) usable with a portable recharger compatible with automobile auxiliary outlets; (8) can be stored in a refrigerator; and, (9) is protected from inadvertent activation.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

SUMMARY AND ADVANTAGES

A rechargeable, self-heating food container is provided and includes a food container including an inner chamber containing a supersaturated salt solution and a trigger in fluid communication with the salt solution for initiating crystallization of the supersaturated salt solution. A rechargeable, self-heating food container includes an inner chamber contained within and sealed from the food containing area of the food container, wherein the inner chamber includes an external opening; a supersaturated salt solution contained within the inner chamber; a trigger inserted into the inner chamber external opening and thereby sealing the external opening, with the trigger in fluid contact with the supersaturated salt solution. A trigger for a rechargeable, self-heating food container may include an impermeable flexible membrane, a first trigger element attached to the inside of the flexible membrane and movable with the flexible membrane; and a second trigger element mounted so as to not move with the flexible membrane, such that when the flexible membrane is pressed the first trigger element contacts the second trigger element, thereby causing nucleation within the supersaturated salt solution and triggering crystallization of the supersaturated salt solution. At least one of the trigger elements should be ceramic steatite, with the other element either ceramic steatite or another hard material such as ceramic, metal, glass, or hard plastic A rechargeable, self-heating, food container preferably uses a supersaturated salt solution of sodium acetate trihydrate, but the solution may be selected from the group of salts consisting of: sodium sulfate decahydrate, sodium thiosulfate pentahydrate, sodium chromate decahydrate, calcium chloride hexahydrate, magnesium chloride hexahydrate, magnesium nitrate phosphate decahydrate, calcium nitrate trihydrate, and, trimethylol ethane hydrate.

A rechargeable heating element for a food container may include a cylinder with an opening, the cylinder insertable into a selected food container with sealing means for sealing said cylinder into said food container; a supersaturated salt solution contained within the cylinder; and a trigger in fluid contact with the supersaturated salt solution, the trigger including an impermeable flexible membrane; a first trigger element attached to the inside of the flexible membrane and movable with the flexible membrane; a second trigger element mounted so as to not move with the flexible membrane; wherein at least one of said first and second trigger elements are made from ceramic steatite; and wherein, when the flexible membrane is pressed the first trigger element contacts the second trigger element, thereby causing nucleation within the supersaturated salt solution and triggering crystallization of the supersaturated salt solution.

A method of heating a food container includes providing a food container with an internal chamber, a supersaturated salt solution contained within the internal chamber, and a trigger including opposing trigger elements in fluid communication with the supersaturated salt solution; compressing the opposing trigger elements, thereby initiating crystal nucleation within the supersaturated salt solution and causing the supersaturated salt solution to crystallize in an exothermic reaction; and recharging the supersaturated salt solution by heating the food container until the supersaturated salt solution crystals have melted and returned to solution; and, cooling the salt solution to a supersaturated state.

Preferably a self-heating rechargeable food container or method for heating food includes microwave safe materials so that the container or heating element can be recharged in a microwave oven. However, a trigger mechanism may include metallic trigger elements precluding use of a microwave.

A portable recharger for a rechargeable heating element of supersaturated salt solution, includes an insulated sleeve for receiving a rechargeable heating element, the insulated sleeve including an inner surface for conducting heat to the rechargeable heating element; an electric resistive heating element in thermal contact with the inner surface; a thermally insulated outer surface; an electrical connector for connecting the electric resistive heating element to an electric power source; and temperature control means for controlling the temperature of the electric resistive heating element. A portable recharger can include a plug connectable to an automobile cigarette lighter. A portable recharger may also include a converter for connecting the portable recharger to a standard 120 vac outlet.

By using the exothermic chemical reaction of a supersaturated salt solution undergoing crystallization, the invention requires no external power source and cannot produce potentially dangerous temperatures. Since the heat source is located internally in the container, heat transfer must occur through the contents and therefore efficiently warms the product. Heat is not lost externally except through the contents of the container. The invention is infinitely rechargeable by means of externally heating the device until the salt solution is transferred from the semi-solid phase back to the liquid phase. After cooling the device is then ready for the next use. The heat source may be activated with a simple button type device located on the bottom of the container. The button is free from accidental activation while providing ease of use. Given that the heat source is non-electric, operation is not confined to any location such as a home or automobile. However, the heat source does lend itself to convenient use with portable recharging devices powered by automobile auxiliary outlets or conventional ac electrical outlets.

A rechargeable, self-heating food container and method for heating food has numerous advantages, such as: (1) it is non-electric; (2) rechargeable; (3) the heat source is internal to the container so more efficient; (4) the maximum temperature is easily limited to prevent scalding; (5) the activator/trigger is easily recessed to prevent inadvertent activation; (6) the food container and contents can be stored in a refrigerator or cooler indefinitely with a heating element; (7) the container and heating element are dishwasher safe; (8) the nutrients of liquids such as breast milk are not harmed by overheating; (9) the heating cycle is relatively quick; (10) heating elements can be used with standard bottles; (11) heating elements can be recharged with a portable recharger which plugs into standard automobile auxiliary outlets.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 2A shows a side-view of a trigger mechanism for a first embodiment.

FIG. 2B shows a view of the inside of a trigger mechanism for a first embodiment.

FIG. 2C shows a view of the outside of a trigger mechanism for a first embodiment.

FIG. 3 shows a side view of a second embodiment of the invention, including a baby bottle with a removable heating element.

FIG. 3A shows a detail trigger mechanism of a third embodiment view shown in FIG. 3.

FIG. 5 shows a side view of a fourth embodiment of the invention with a removable heating element and a portable recharger.

FIG. 5A shows a transparent perspective view of a detail shown in FIG. 5.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
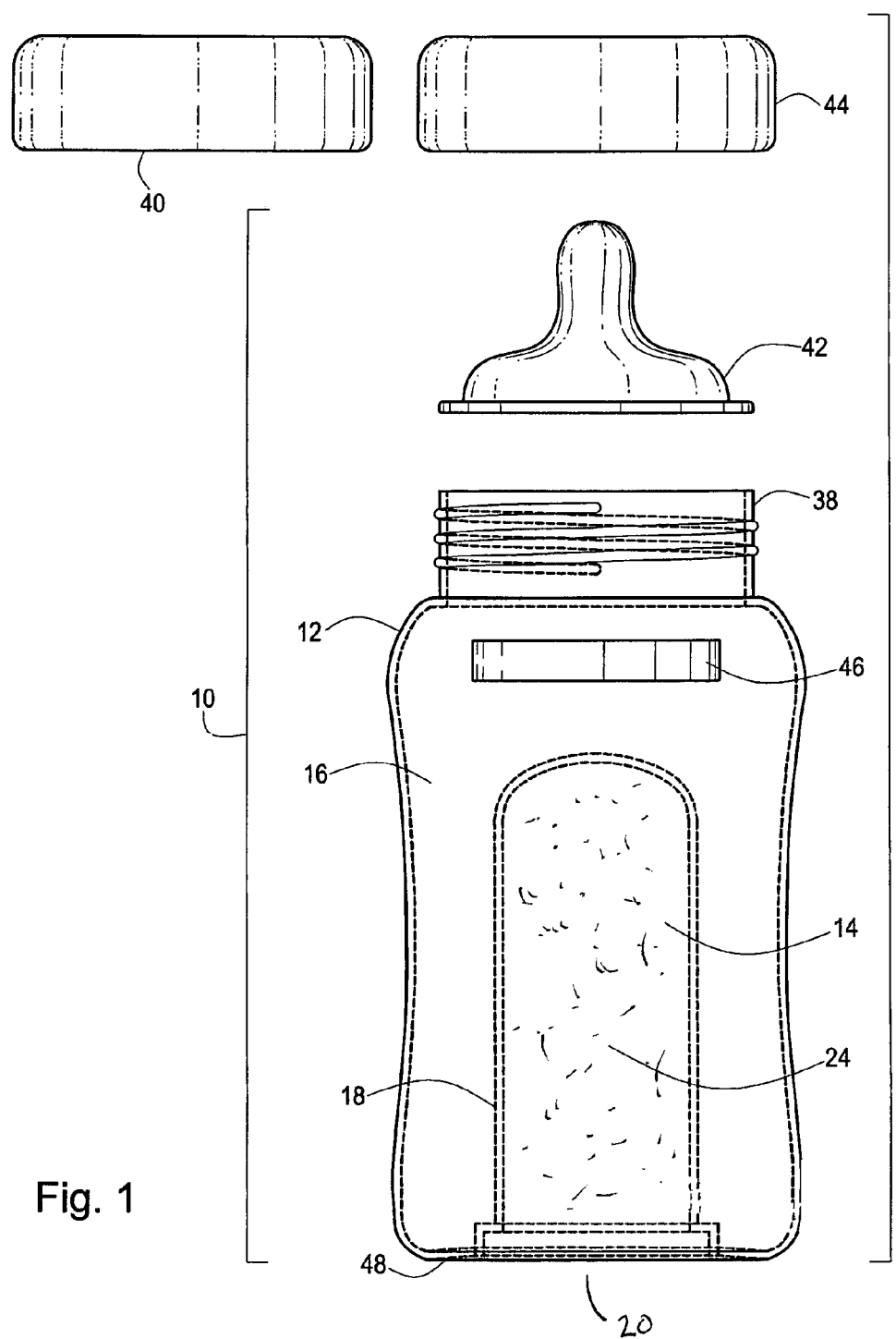
FIG. 1 shows a side-view of a first embodiment of the invention as a baby bottle.

Referring to FIGS. 1-2C, a rechargeable, self-heating food container 10 is provided. A rechargeable, self-heating food container 10 comprises a food container 12 with inner chamber 14, where inner chamber 14 is contained within food container 12 and sealed from the food area 16 by inner wall 18. Inner chamber 14 includes an outer opening 20. Inner cavity 14 contains a supersaturated salt solution 24 which acts as a rechargeable heat source. Inner cavity opening 20 is sealed by a trigger 22. Trigger 22 includes impermeable flexible membrane 26, first trigger element holder 28 attached to a flexible impermeable membrane 26, where first trigger element holder 28 holds a first trigger element 30. A second trigger element holder 32 with second ceramic element 34 is fixedly attached to plug flange 36 so as not to move when flexible membrane 26 is pressed. Preferably both trigger elements are made from steatite. Alternatively, one trigger element could be made from steatite and the other element could be a different hard material such as ceramic, glass, or hard plastic. A trigger 22 includes a plug flange 36 for sealing against inner cavity opening 20. Plug flange 36 is semi-rigid or rigid in order to fit snugly into outer opening 20. Plug flange 36 may be sealed into outer opening 20 by friction fit, or by permanent methods such as welding, fusing, or gluing, or equivalent means. Food container 12 can include resealing means 38 which can accept a cap 40. In a preferred embodiment, food container 12 is a baby bottle with threads 38 which can accept standard threaded cap 40. Food container 12 can be a baby bottle which accepts a dispensing nipple 42 which is sealed to resealing means 38 by threaded collar 44. A rechargeable, self-heating food container can be made from materials which are safe to place in a microwave oven, including all non-metallic components. A rechargeable, self-heating food container may include thermally insulated walls. A rechargeable, self-heating food container may include a temperature indicator 46, which may be a plastic strip thermometer with thermochromic material embedded in it.

The supersaturated salt solution 24 of a rechargeable, self-heating food container is a supersaturated salt solution with a crystal melt point above room temperature, but which can exist as supersaturated solution at room temperature and which releases heat during the process of crystallization. Supersaturated salt solution 24 may comprise a solution of sodium acetate trihydrate ($Na_2C_2H_3O_2$-$3H_2O$), sodium sulfate decahydrate ($Na_2SO4$-$0H_2O$), sodium thiosulfate pentahydrate ($Na_2S_2O_3$-$5H_2O$), sodium chromate decahydrate ($Na_2CrO_4$-$10H_2O$), calcium chloride hexahydrate ($CaCl_2$-$6H_2O$), magnesium chloride hexahydrate ($MgCl_2$-$6H_2O$), magnesium nitrate phosphate dodecahydrate ($Mg_2(NO_3)(PO_4)$-$12H_2O$), calcium nitrate trihydrate ($Ca(NO_3)_2$.$3H_2O$), or trimethylol ethane hydrate ($C_5H_{12}O_3$.$H_2O$).

In this embodiment the trigger elements 30 and 34 are cylindrical in shape, for ease of manufacture and assembly, but other shapes could be used.

Referring to FIGS. 3-3A, a rechargeable, self-heating food container may include a removable rechargeable heating element 114 containing a supersaturated salt solution 124, with opening 120 sealed by a trigger 122. A removable heating element 114 may be insertable into a bottom opening 148 of a food container 112, with threads 158 engaging threads 154 to compress o-ring 160 and seal food container 112. A trigger 122 includes a rigid or semi-rigid plug flange 136 for sealing against opening 120. A trigger may include a first trigger element holder 128 with a first trigger element 130, attached to impermeable flexible membrane 126, and a second trigger element holder 132 rigidly attached to plug flange 136 with a second trigger element 134.

Figures 4, 4A:
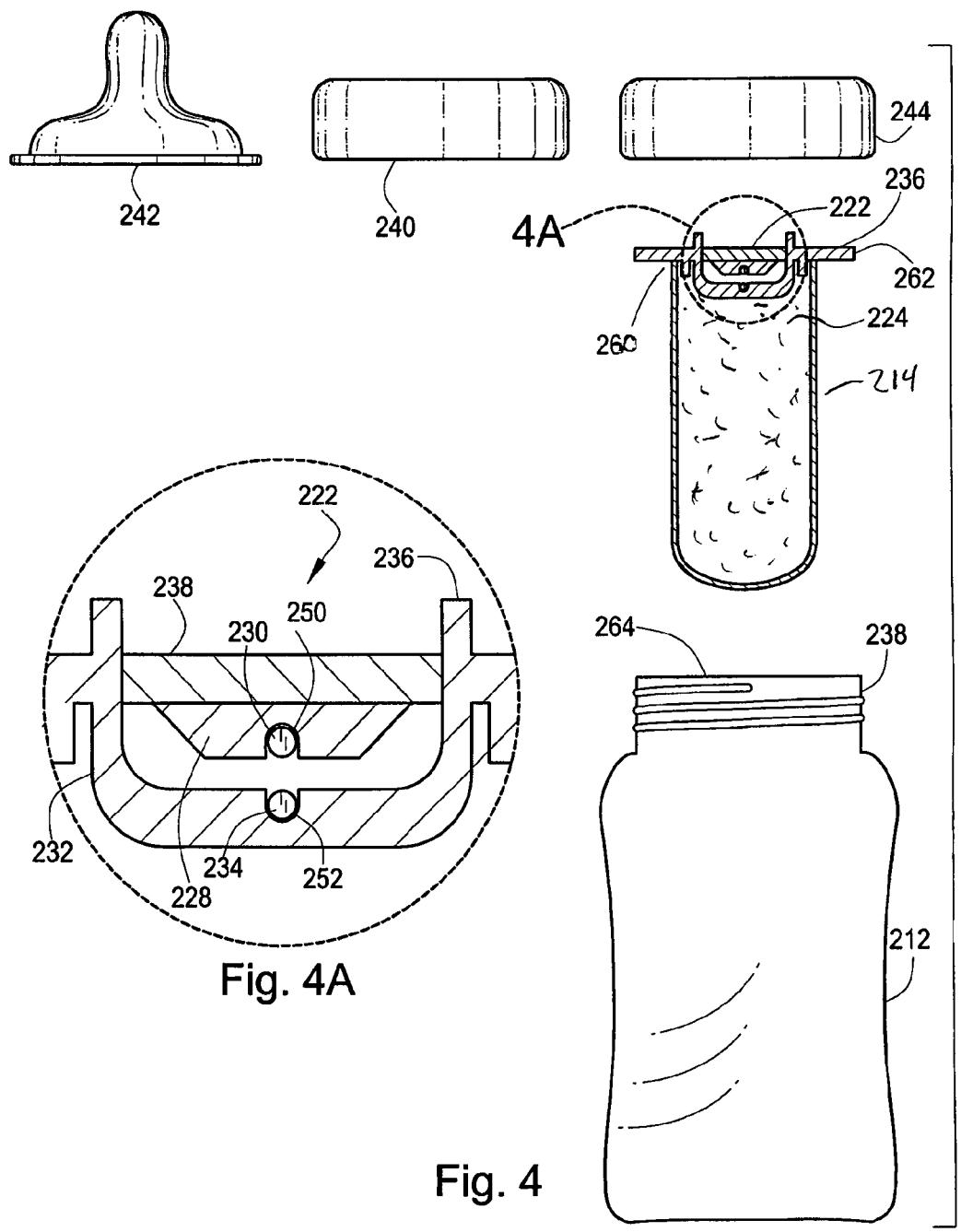
FIG. 4 shows a side-view of a third embodiment of the invention used with a conventional baby bottle.
FIG. 4A shows a detail trigger mechanism of a third embodiment view shown in FIG. 4.

Referring to FIGS. 4-4A, a rechargeable, self-heating food container may include a removable rechargeable heating element 214 which is insertable into a standard food container 212.

Referring to FIGS. 1-2C, a method of heating a food container includes providing a food container with an internal chamber, a supersaturated salt solution 24 contained within the internal chamber 14, and a trigger 22 including opposing trigger elements 30 and 34 in fluid communication with the supersaturated salt solution 24; compressing the opposing trigger elements 30 and 34, thereby initiating crystal nucleation within the supersaturated salt solution 24 and causing the supersaturated salt solution to crystallize in an exothermic reaction; recharging the supersaturated salt solution by heating the food container 12 until the salt crystals 24 have melted and returned to solution; and letting the solution cool to a supersaturated state. A method for heating a food container includes providing a supersaturated salt solution 24 selected from the group of salts consisting of sodium acetate trihydrate ($Na_2C_2H_3O_2$-$3H_2O$), sodium sulfate decahydrate ($Na_2SO4$-$0H_2O$), sodium thiosulfate pentahydrate ($Na_2S_2O_3$-$5H_2O$), sodium chromate decahydrate ($Na_2CrO_4$-$10H_2O$), calcium chloride hexahydrate ($CaCl_2$-$6H_2O$), magnesium chloride hexahydrate ($MgCl_2$-$6H_2O$), magnesium nitrate phosphate dodecahydrate ($Mg_2(NO_3)(PO_4)$-$12H_2O$), calcium nitrate trihydrate ($Ca(NO_3)_2$.$3H_2O$), and trimethylol ethane hydrate ($C_5H_{12}O_3$.$H_2O$). A method of heating a food container includes a method where at least one of the trigger elements 30 and 34 is made from ceramic steatite, the salt solution 24 is sodium acetate trihydrate ($Na_2C_2H_3O_2$-$3H_2O$), and recharging the salt solution includes heating the food container 12 to at least 54° C. (131° F.) until the salt crystals 24 are completely dissolved. A method of heating a food container may include recharging the salt solution by heating the food container in a microwave oven.

Figure 6:
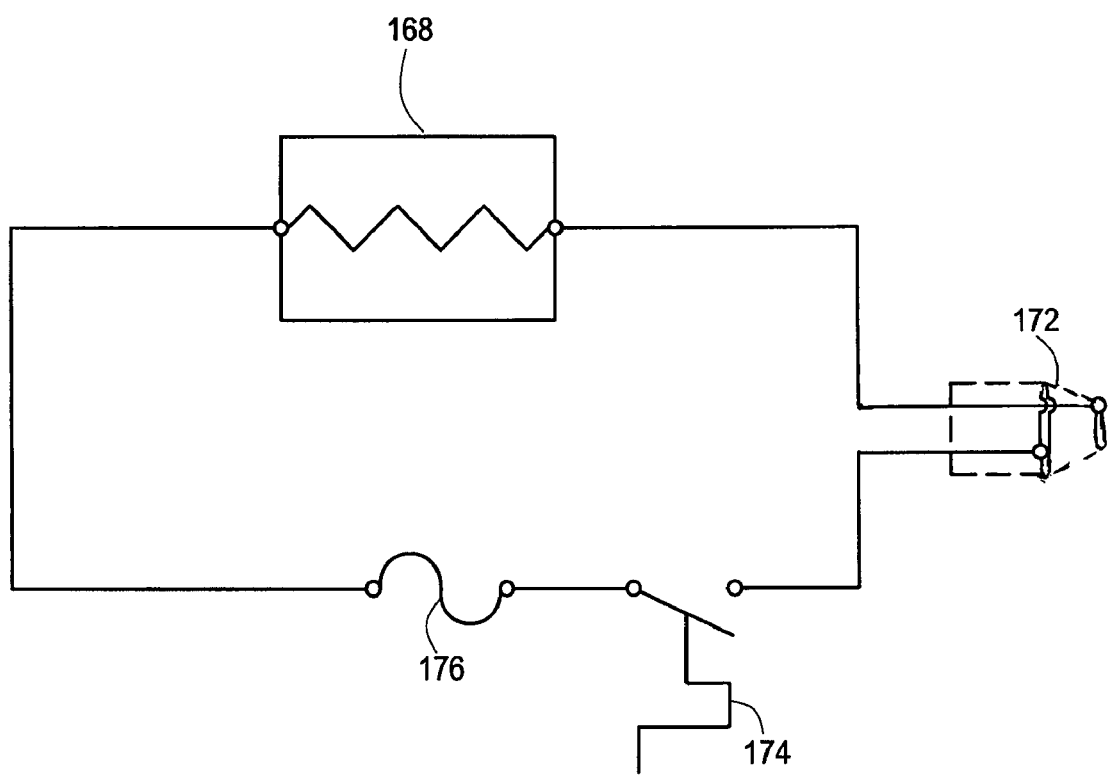
FIG. 6 shows a simplified circuit diagram for a portable recharger for a removable heating element of a rechargeable self-heating food container.

Referring to FIGS. 5-6, a portable recharger 162 for a rechargeable heating element of supersaturated salt solution 114 includes an insulated sleeve for receiving a rechargeable heating element 114, the insulated sleeve including an inner surface 166 for conducting heat to the rechargeable heating element 114, an electric resistive heating element 168 in thermal contact with the inner surface 166, a thermally insulated outer surface 170, an electrical connector 172 for connecting the resistive heating element 168 to an electric power source, and temperature control means consisting of bimetallic thermostatic switch 174 and fusible link 176 for controlling the temperature of the resistive heating element. A portable recharger can include a electrical connector 172 connectable to an automobile cigarette lighter. A portable recharger can also include a converter 178 for connecting the recharger to a standard 120 vac outlet.

Referring to FIGS. 1-2C, a first embodiment is shown. In this first embodiment food container 12 is a baby bottle, with a threaded opening 38 which is approximately two inches (52.4 mm) in diameter. Threaded collar 44 can be screwed over nipple 42 for feeding, or alternatively threaded cap 40 could be screwed on for storage. Inner chamber 14, defined by a continuous inner chamber wall 18, is approximately one inch (25.4 mm) in diameter and protrudes into the baby bottle. The boundary 48 between food container 12 and inner cavity wall 18 is permanently sealed to prevent leaks and provide mechanical strength to the bottle bottom. Inner cavity 14 contains a supersaturated salt solution 24. Inner chamber 14 is disposed vertically within food container 12 for ease of use and efficiency in heating and cleaning, but other arrangements could be used. Vertical alignment allows contact with the drinking fluid along the entire surface of heating element 24 via inner chamber wall 18. Food container 12 and inner chamber wall 18 are preferably made from polycarbonate. Polycarbonate provides suitable strength, is shatter-proof and therefore safer than glass, is dishwasher safe and microwave safe, and easy to manufacture. Other food safe materials could also be used, such as glass, polyethylene, polypropylene, silicone or other suitable materials. Food container 12 and inner chamber wall 18 can be joined by gluing, welding or fusion methods, or could be formed as a unitary piece by injection molding or blow molding.

Salt solution 24 preferably is a solution of sodium acetate trihydrate, which can exist as a supersaturated salt solution at room temperature (the process is described above), has a relatively low melt point, and is non-toxic. Salt solution 24 could utilize similar salt solutions, including: sodium sulfate decahydrate, sodium thiosulfate pentahydrate; sodium chromate decahydrate; calcium chloride hexahydrate; magnesium chloride hexahydrate; magnesium nitrate phosphate decahydrate; calcium nitrate trihydrate; and, trimethylol ethane hydrate. Sodium acetate trihydrate and sodium sulfate decahydrate have the advantages of being well known and relatively inexpensive, as well as non-toxic, although any of the listed salts would operate with the invention. The specific physical properties of a given salt solution will vary for each salt, but these properties are known in the art and easily obtained. Sodium acetate trihydrate is used here as exemplary of these solutions because other supersaturated salt solutions work on the same principles.

Trigger 22 includes flexible membrane 26 with a perimeter formed by rigid or semi-rigid plug flange 36 which seals against inner cavity opening 20. Plug flange 36 also provides a recess within which flexible membrane 26 sits, so it is protected from inadvertent activation when handled and stored. This way, trigger 22 is activated only selectively rather than due to any jarring or impact event.

First trigger element holder 28 is attached to and moves with flexible membrane 26 and includes groove 50 to hold first trigger element 30. Second trigger element holder 32 is rigidly attached to plug flange 36 at opposing sides so as to remain stationary when flexible membrane 26 is flexed, and includes groove 52 to hold second trigger element 34. Trigger elements 30 and 34 are preferably small cylinders for ease of manufacturability and replacement, but other shapes could be used. Trigger elements 30 and 34 include at least one ceramic steatite element with the other made from a hard material such as ceramic, glass, hard plastic, or metal, but both elements could be made from steatite. Preferably both trigger elements 30 and 34 are made from microwave safe materials for convenience of use, but metal trigger elements could also be used. Flexible membrane 26 is preferably a flexible plastic, but any suitable food safe material could be used.

In operation of the first embodiment, the food container 12, a baby bottle in this case, is filled with milk or some other drink in food area 16 and has a nipple 42 installed. The bottle of milk can remain refrigerated until used. The operator presses flexible membrane 26 and then releases it, causing first trigger element 30 to compress against second trigger element 34. The compression causes crystal nucleation within the supersaturated salt solution 24, creating a cascading effect so that the entire salt solution rapidly crystallizes (freezes) in an exothermic reaction. The heat generated is released through inner wall 14 into the milk, which is heated to the desired temperature, and can then be consumed. When finished, the bottle 12 can be washed conventionally. After washing the bottle can placed in a microwave oven on the defrost setting for approximately four minutes or until the solution is completely dissolved, or the bottle may be placed in water heated above 54° C. (131° F.) until the salt crystals 24 are completely melted and dissolved (in boiling water this requires approximately 10 minutes). Alternatively, the bottle could be placed in a portable bottle sterilizer for approximately 15 minutes, which is a small chamber using steam to sterilize baby bottles. Some dishwashers with a sanitize setting can be used, so that the wash cycle is also sufficient to recharge the salt solution. After recharging the bottle is ready for reuse. After recharging bottle 12 can be filled with milk or other drinks and stored in a refrigerator indefinitely, ready for future use.

As shown in FIG. 3, in a second embodiment, heating element 114 is a self-contained removable module containing the supersaturated salt solution. Heating element 114 is generally cylindrical in shape for inserting into food container 112. Food container 112 includes a bottom opening 148 with bottom threads 154. Heating element 114 is generally cylindrical with an open end 156, and includes complimentary engaging threads 158 and O-ring 160. O-ring 160 could alternatively be a gasket. O-ring/gasket 160 is made from food safe silicone or rubber, or some other suitable food safe material. Trigger 122 includes a flexible membrane 126 with a perimeter formed by rigid or semi-rigid plug flange 136 which seals heating element open end 156. Plug flange 136 could be removably installed or permanently sealed by bonding with glue, resin, welding, or other equivalent methods. First trigger element holder 128 is attached to and moves with flexible membrane 126 and includes groove 150 to hold first trigger element 130. Second trigger element holder 132 is rigidly attached to plug flange 136 at opposing sides so as to remain stationary when flexible membrane 126 is flexed, and includes groove 152 to hold second trigger element 134. Trigger elements 130 and 134 are preferably small cylinders of ceramic steatite for ease of manufacturability and replacement, but other shapes could be used. At least one of trigger elements 130 and 134 must be ceramic steatite, with the other trigger element made from a hard material such as ceramic, glass, hard plastic, or metal.

The second embodiment is used similarly to the first embodiment. Heating element 114 is threaded into bottom opening 148 of food container 112, which is then filled with milk. Flexible membrane 126 is compressed, causing first trigger element 130 to compress against second trigger element 134, causing nucleation and initiating the exothermic crystallization reaction described above. When done with the milk, heating element 114 can be removed for washing and recharging, or left inserted into the bottle. For rapid reuse, heating element 114 could be removed and a second heating element, already clean and recharged, inserted for use. This way the user, perhaps traveling or out for the day, can bring a single bottle and several heating elements 114, which are smaller and easier to carry, for multiple uses.

As shown in FIG. 4, in a third embodiment, heating element 214 may be inserted into top opening 264 of a typical baby bottle or insulated thermos 212 and held in place by threaded collar 244. Heating element 214 is generally cylindrical with open end 260, and trigger 222 which fits into open end 260 to seal the salt solution inside. The diameter of heating element 214 is less than the top opening 264 of bottle 212. Plug flange 236 includes outer flange 262 seals against the edge of top opening 264 when compressed by threaded collar 244, so that trigger 222 is essentially interchangeable with nipple 242. Trigger 222 includes a flexible membrane 226 with a perimeter formed by rigid or semi-rigid plug flange 236 which seals heating element open end 260. First trigger element holder 228 is attached to and moves with flexible membrane 226 and includes groove 250 to hold first trigger element 230. Second trigger element holder 232 is rigidly attached to plug flange 236 at opposing sides so as to remain stationary when flexible membrane 226 is flexed, and includes groove 252 to hold second trigger element 234. Trigger elements 230 and 234 are preferably small cylinders of ceramic steatite for ease of manufacturability and replacement, but other shapes could be used. The dimensions and threading of heating element 214 may be designed to work with standard bottle or food container sizes.

In operation the third embodiment operates similarly to the second embodiment, but is useful with conventional baby bottles or thermoses, the operator just has to leave some room in the bottle to displace liquid from inserting heating element 214. Once triggered by compressing flexible membrane 226 the heating element works as described above. When the desired temperature is reached, or the heating element has completed its heating cycle, the heating element may be removed and replaced with nipple 242 for use. This has the advantage of being adaptable to standard baby bottles, thermoses, or other food containers such as thermoses or water bottles used by backpackers, (especially the popular widemouth bottles produced by Nalgene™ and other manufacturers) not designed with an internal chamber. Other shape combinations, including rectangular food containers and heating elements could be used without departing from the invention.

Referring to FIG. 1, a rechargeable, self-heating food container can include a temperature indicator 46 positioned on the exterior surface of food container 12 so as to not contact the food inside. Plastic strip thermometers using thermochromic liquid crystals embedded in a thin plastic film are suitable for this purpose. The thermochromic crystals change color based on temperature, can be manufactured cheaply, and don't use toxic materials such as mercury (they are commonly used in medicine for disposable thermometers). Adhering a small strip thermometer to the outside of a rechargeable, self-heating food container or baby bottle allows the user to ensure the contents will not scald or cause discomfort for the consumer. Other indicators could be used, such as temperature patches, similar to strip thermometers but which are manufactured to change color or visibility at only a specified temperature—i.e. a go-no go indicator. Pop-up thermometers, commonly used in cooking applications, could also be used. Microwave and dishwasher safe indicators are preferable for convenience.

Referring to FIGS. 5-6, a rechargeable, self-heating food container system is shown. The system includes a self-contained heating element 114, as described above, which is insertable into a portable electric powered recharger 162. Recharger 162 includes a receiving slot 164 defined by inner wall 166, dc heating element 168 embedded behind wall 166 and in thermal contact with inner wall 166, and insulating outer wall 170 completely surrounding heating element 168, to protect the user from heating element 168. Receiving slot 164 is sized to receive rechargeable heating element 114 snugly. Preferably inner wall 166 is metallic to maximize heat transfer efficiency and durability. Stainless steel or aluminum are preferred, but any suitable material could be used. Resistive heating element 168 is electrically insulated for safety. Recharger 162 includes plug 172 which is designed to plug into standard automobile cigarette lighters to provide the electrical power for resistive heating element 168. Alternatively, plug 172 could be designed to plug into or adapt to standard auxiliary outlets provided in many newer automobiles. Bimetallic switch 174 may be included to control the temperature of resistive heating element 168 and act as a first safety interlock. Fusible link 176 is included for secondary overheat protection. A thermostatic switch, rheostat, or digital temperature controller, devices well known in the art, could be incorporated for more precise control and safety. A standard ac-dc converter 178 can be included to allow the recharger to plug into standard 120 vac outlets.

A rechargeable, self-heating food container system operates in much the same way as the second or third embodiment described above. Heating element 114 can be wiped clean after use and placed into portable electric recharger 162. Portable recharger 162 can be plugged into standard automobile auxiliary outlets, or using an ac-dc converter can be plugged into standard 120 vac outlets. Maintaining portable recharger 162 temperature above approximately 156° F. for several minutes will simultaneously recharge heating element 114 and sterilize it.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A rechargeable food heating system comprising:
a food container, said food container including an opening for receiving a rechargeable heating element; and,
a rechargeable heating element insertable into said food container, said heating element including a supersaturated salt solution contained within said rechargeable heating element; and a trigger in fluid contact with said supersaturated salt solution, said trigger comprising:
an impermeable flexible membrane disposed within a surrounding rigid plug flange;
a first trigger element holder having a first side attached to the inside of said flexible membrane and second side retaining a first trigger element, said first trigger element consisting of a ceramic ball, said first trigger element holder movable with said flexible membrane; and,
a second trigger element holder comprising a rigid bridge portion connected at opposing ends to and spanning said plug flange and a trigger face, said trigger face rigidly retaining a second trigger element spaced apart from and directly facing said first trigger element, said second trigger element consisting of a ceramic ball;
such that when said flexible membrane is pressed said first trigger element contacts said second trigger element, thereby causing nucleation within said supersaturated salt solution and triggering crystallization of said supersaturated salt solution.

2. A rechargeable heating element for a food container comprising:
a cylinder with an opening, said cylinder insertable into a selected food container;
sealing means for sealing said cylinder into said food container;
a supersaturated salt solution contained within said rechargeable cylinder; and
a trigger sealingly inserted into said cylinder opening and in fluid contact with said supersaturated salt solution, said trigger comprising:
an impermeable flexible membrane;
a first trigger element attached to the inside of said flexible membrane and movable with said flexible membrane;
a second trigger element mounted so as to not move with said flexible membrane;
wherein at least one of said first and second trigger elements are comprised of ceramic steatite;
and further wherein, when said flexible membrane is pressed said first trigger element contacts said second trigger element, thereby causing nucleation within said supersaturated salt solution and triggering crystallization of said supersaturated salt solution.

3. A rechargeable, self-heating food container, comprising:
a food container including an inner chamber;
a salt solution contained within said inner chamber, said salt solution able to exist as a supersaturated solution at room temperature; and,
a trigger in fluid communication with said salt solution for initiating crystallization of said salt solution under supersaturated conditions, said trigger comprising:
an impermeable flexible membrane disposed within a surrounding rigid plug flange;
a first trigger element holder having a first side attached to the inside of said flexible membrane and second side retaining a first trigger element, said first trigger element consisting of a ceramic ball, said first trigger element holder movable with said flexible membrane; and,
a second trigger element holder comprising a rigid bridge portion connected at opposing ends to and spanning said plug flange and a trigger face, said trigger face rigidly retaining a second trigger element spaced apart from and directly facing said first trigger element, said second trigger element consisting of a ceramic ball;
such that when said flexible membrane is pressed said first trigger element contacts said second trigger element, thereby causing nucleation within said supersaturated salt solution and triggering crystallization of said supersaturated salt solution.

4. A rechargeable, self-heating food container as in claim 3, wherein said supersaturated salt solution is selected from the group of salts consisting of: sodium acetate trihydrate, sodium sulfate decahydrate, sodium thiosulfate pentahydrate, sodium chromate decahydrate, calcium chloride hexahydrate, magnesium chloride hexahydrate, magnesium nitrate phosphate decahydrate, calcium nitrate trihydrate, and, trimethylol ethane hydrate.

5. A rechargeable, self-heating food container as in claim 3, wherein said supersaturated salt solution is sodium acetate trihydrate.

6. A rechargeable, self-heating food container as in claim 3, wherein said food container is a baby bottle.

7. A rechargeable, self-heating, food container, comprising:
a food container including an inner chamber contained within and sealed from the food containing area of said food container, wherein said inner chamber includes an external opening;
a supersaturated salt solution contained within said inner chamber; and,
a trigger sealingly inserted into said inner chamber external opening and in fluid contact with said supersaturated salt solution, said trigger comprising:
an impermeable flexible membrane disposed within a surrounding rigid plug flange;
a first trigger element holder having a first side attached to the inside of said flexible membrane and second side retaining a first trigger element, said first trigger element consisting of a ceramic ball, said first trigger element holder movable with said flexible membrane; and,
a second trigger element holder comprising a rigid bridge portion connected at opposing ends to and spanning said plug flange and a trigger face, said trigger face rigidly retaining a second trigger element spaced apart from and directly facing said first trigger element, said second trigger element consisting of a ceramic ball;
such that when said flexible membrane is pressed said first trigger element contacts said second trigger element, thereby causing nucleation within said supersaturated salt solution and triggering crystallization of said supersaturated salt solution.

8. A rechargeable, self-heating, food container as in claim 1, wherein at least one of said first and second trigger elements is made from ceramic steatite.

9. A rechargeable, self-heating, food container as in claim 1, wherein said supersaturated salt solution is selected from the group of salts consisting of: sodium acetate trihydrate, sodium sulfate decahydrate, sodium thiosulfate pentahydrate, sodium chromate decahydrate, calcium chloride hexahydrate, magnesium chloride hexahydrate, magnesium nitrate phosphate decahydrate, calcium nitrate trihydrate, and, trimethylol ethane hydrate.

10. A rechargeable, self-heating, food container as in claim 1, wherein said supersaturated salt solution is sodium acetate trihydrate.

11. A rechargeable, self-heating, food container as in claim 1, wherein each of said first and second elements are comprised of ceramic steatite.

12. A rechargeable, self-heating, food container as in claim 1, wherein said food container is resealable.

13. A rechargeable, self-heating, food container as in claim 1, wherein said food container comprises a bottle including receiving means for receiving alternatively a bottle nipple and a cap.

14. A rechargeable, self-heating food container as in claim 1, wherein said food container outer walls are thermally insulated.

15. A rechargeable, self-heating, food container as in claim 1, wherein said food container is made from microwave-safe materials.

16. A rechargeable, self-heating, food container as in claim 1, wherein said food container includes a temperature indicating device.

\* \* \* \* \*